US006837685B2

(12) United States Patent  
Pierre

(10) Patent No.: US 6,837,685 B2
(45) Date of Patent: Jan. 4, 2005

(54) METHODS AND APPARATUS FOR REPAIRING A ROTOR ASSEMBLY OF A TURBINE

(75) Inventor: Sylvain Pierre, Greer, SC (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 10/319,101

(22) Filed: Dec. 13, 2002

(65) Prior Publication Data

US 2004/0115056 A1 Jun. 17, 2004

(51) Int. Cl.⁷ ................................................. F01D 5/30
(52) U.S. Cl. .................................. 416/219 R; 416/248
(58) Field of Search ........................ 416/219 R, 220 R, 416/221, 248, 239

(56) References Cited

U.S. PATENT DOCUMENTS

| 5,883,456 | A | 3/1999 | Gardner et al. |
| 6,085,417 | A | 7/2000 | Anderson, III et al. |
| 6,115,917 | A | 9/2000 | Nolan et al. |
| 6,168,382 | B1 | 1/2001 | Nolan et al. |
| 6,471,474 | B1 * | 10/2002 | Mielke et al. ........... 415/199.4 |
| 6,524,070 | B1 * | 2/2003 | Carter .................... 416/193 A |

OTHER PUBLICATIONS

TOSHIBA, Blending Repair Quality Record.

* cited by examiner

Primary Examiner—Edward K. Look
Assistant Examiner—Kimya N McCoy
(74) Attorney, Agent, or Firm—Armstrong Teasdale LLP

(57) ABSTRACT

A method of repairing a rim of a rotor wheel is provided. The rotor wheel includes a rim, the rim having at least one slot defined by a slot bottom wall and at least one corner, the slot sized to receive the dovetail of a rotor blade therein. The method includes forming a first pocket at the at least one corner, wherein the first pocket has a first radius of curvature and forming a second pocket along the slot bottom wall, wherein the second pocket has a second radius of curvature and is spaced a distance along the slot bottom wall from the first notch.

18 Claims, 5 Drawing Sheets

METHODS AND APPARATUS FOR REPAIRING A ROTOR ASSEMBLY OF A TURBINE

BACKGROUND OF THE INVENTION

The present invention relates generally to turbine engines and more particularly to methods and apparatus for repairing rotor assemblies used within turbine engines.

At least some known turbine rotor assemblies include a rotor wheel to which a plurality of blades are coupled. The blades extend radially outward from a platform that extends between an airfoil potion of the blade and a dovetail portion of the blade. The dovetail portion of the blade has at least one pair of dovetail tangs that couples each rotor blade to a complimentary dovetail slot in an outer rim of the rotor wheel. Each of these slots are formed at an angle, called a skew angle, relative to the turbine center line.

Dovetail slots in the outer rim are sized to receive the dovetail tangs of the dovetail portion of the blade. The dovetail slot has at least one thick corner and one acute corner. The acute corners in a dovetail slot represent a natural geometric stress concentration, which is accentuated by the dovetail slot skew angle and the operational duty of the equipment. If cracks initiate during service, they may become susceptible to high cycle fatigue. Over time, continued operation with dovetail slots may cause blade release.

If cracks are found near these locations through normal rotor maintenance, the affected rotors may be either retired from service or repaired. At least some known repair methods included a manual grinding operation to remove the crack from the dovetail. However, this process may introduce undesirable high stress concentrations into the dovetail, which may result in reducing the component life capability.

BRIEF DESCRIPTION OF THE INVENTION

In one aspect, a method of repairing a rim of a rotor wheel is provided. The rotor wheel includes a rim, the rim having at least one slot defined by a slot bottom wall and at least one corner, the slot sized to receive the dovetail of a rotor blade therein. The method includes forming a first pocket at the at least one corner, wherein the first pocket has a first radius of curvature and forming a second pocket along the slot bottom wall, wherein the second pocket has a second radius of curvature and is spaced a distance along the slot bottom wall from the first notch.

In another aspect, a rotor assembly for a turbine is provided. The rotor assembly includes a rotor wheel having a rim, the rim includes at least one slot defined by a slot bottom wall and at least one corner, the at least one slot is sized to receive a dovetail of a rotor blade therein. The at least one corner includes a first pocket having a first radius of curvature and the slot bottom wall includes a second pocket having a second radius of curvature. The second pocket is spaced a distance along the slot bottom wall from the first notch. The first and second notches are configured to facilitate reducing stresses in the rim.

In a further aspect, a turbine including at least one rotor assembly is provided. The rotor assembly includes at least one rotor wheel with an outer rim and at least one slot in the outer rim. The at least one slot is defined by a slot bottom wall and at least one corner and is sized to receive a dovetail of a rotor blade therein. A first pocket is formed in the at least one corner and has a first radius of curvature. A second pocket has a second radius of curvature and is spaced a distance along the slot bottom wall. The first and second notches are configured to facilitate reducing stresses in the rim.

DETAILED DESCRIPTION OF THE INVENTION

Figure 1:
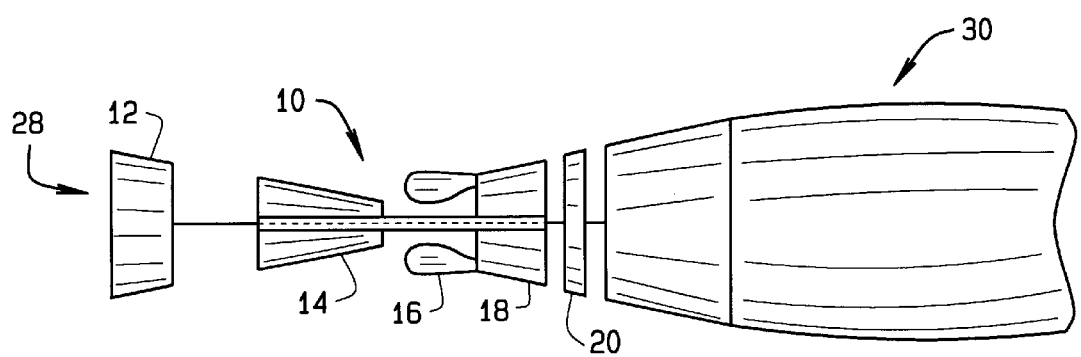
FIG. 1 is a perspective partial cut away view of a gas turbine.

FIG. 1 is a perspective partial cut away view of a gas turbine 10 including a rotor 12 that includes a shaft 14 and a compressor 16. Compressor 16 includes a plurality of axially-spaced rotor wheels 18. A plurality of blades 20 are mechanically coupled to each rotor wheel 18. More specifically, blades 20 are arranged in rows that extend circumferentially around each rotor wheel 18. A plurality of stationary vanes 22 extend circumferentially around shaft 14 and are axially positioned between adjacent rows of blades 20. Vanes 22 cooperate with blades 20 to form a compressor stage and to define a portion of a flow path through turbine 10.

In operation, gas 24 enters an inlet 26 of turbine 10 and is channeled through vanes 22. Vanes 22 direct gas 24 downstream against blades 20. Gas 24 passes through the remaining stages imparting a force on blades 20 causing rotor 12 to rotate. At least one end of turbine 10 may extend axially away from rotor 12 and may be attached to a load or machinery (not shown), such as, but not limited to, a generator, and/or another turbine. Accordingly, a large gas turbine unit may actually include several turbines that are all co-axially coupled to the same shaft 14. Such a unit may, for example, include a high-pressure turbine coupled to an intermediate-pressure turbine, which is coupled to a low-pressure turbine. In one embodiment, gas turbine 10 is commercially available from General Electric Power Systems, Schenectady, N.Y.

Figure 2:
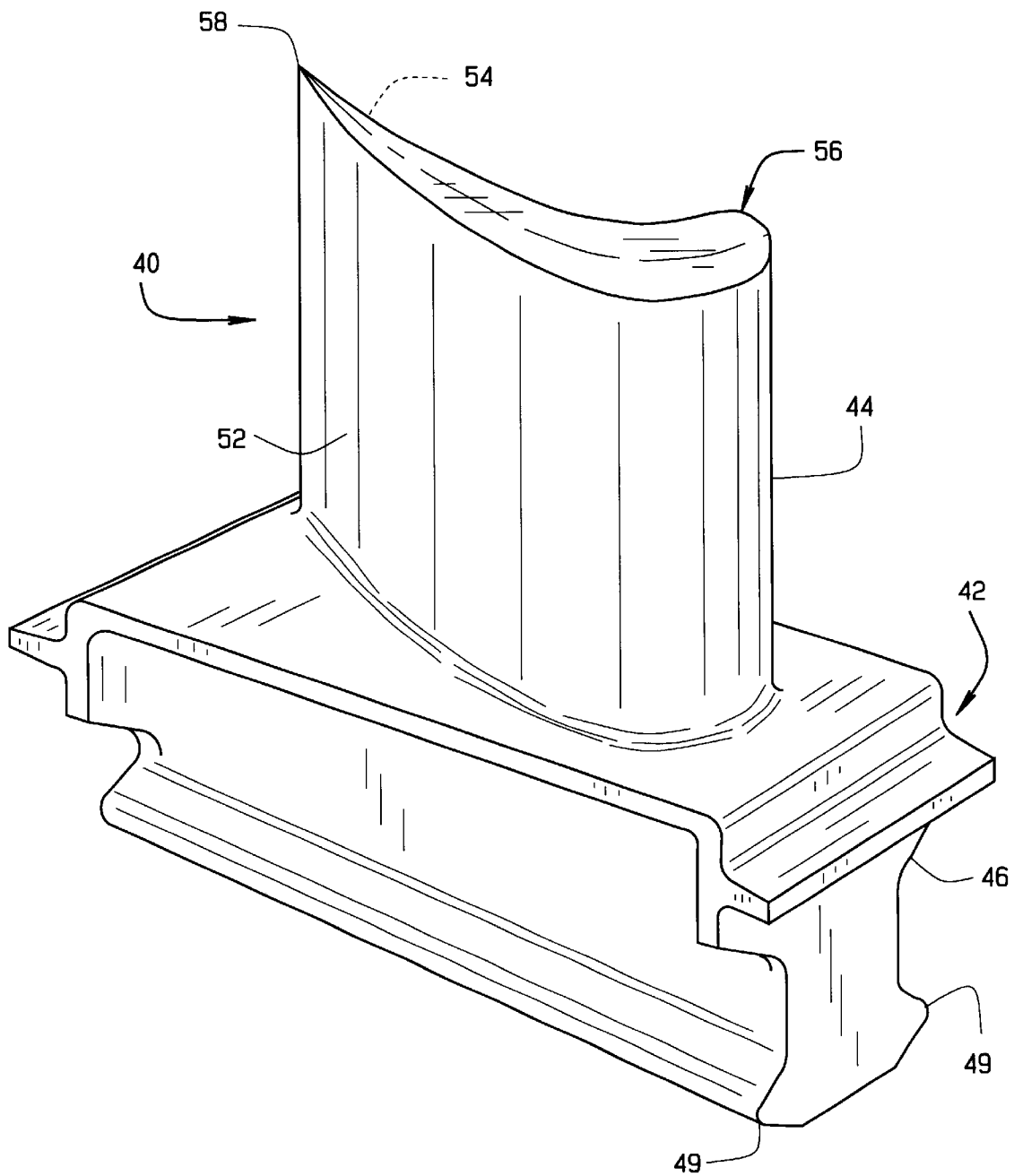
FIG. 2 is a partial perspective view of a rotor blade that may be coupled with the gas turbine engine shown in FIG. 1.

FIG. 2 is a perspective view of a rotor blade 40 that may be used with a turbine engine, such as gas turbine engine 10 shown in FIG. 1. In one embodiment, a plurality of rotor blades 40 form a high pressure compressor rotor blade stage (not shown) of gas turbine engine 10. Each rotor blade 40 includes a platform 42, an airfoil 44 extending radially outward from platform 42, and an integral dovetail 46 that extends radially inward from platform 42. Dovetail includes at least one pair of dovetail tangs 49 used for mounting airfoil 44 to compressor wheel 41.

Blade 40 includes a first contoured sidewall 52 and a second contoured sidewall 54. First sidewall 52 is convex and defines a suction side of blade 40, and second sidewall 54 is concave and defines a pressure side of blade 40. Sidewalls 52 and 54 are joined at a leading edge 56 and at an axially-spaced trailing edge 58 of blade 44.

Figure 3:
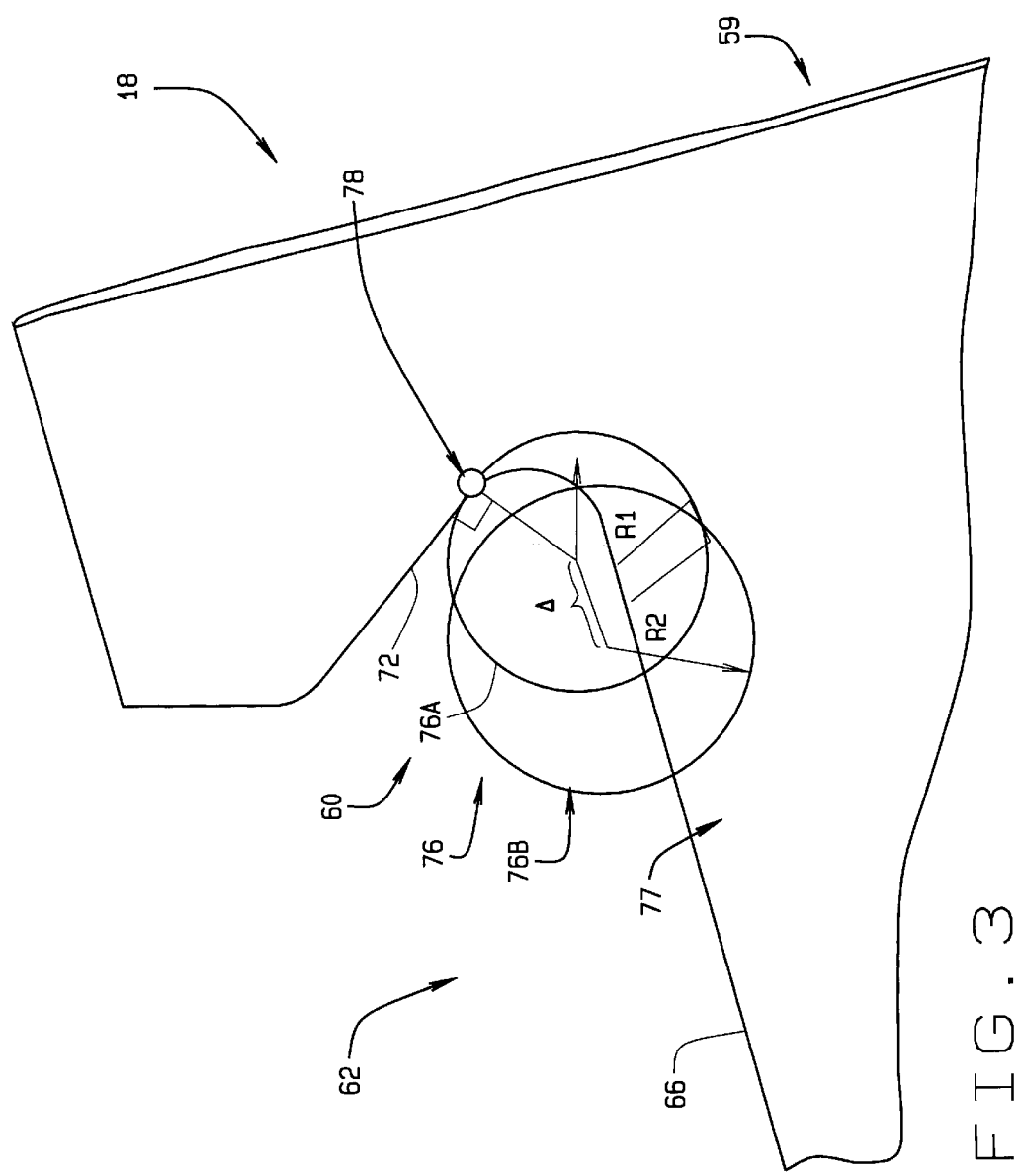
FIG. 3 is a side view of a rim of a rotor assembly of the gas turbine in FIG. 1 showing the repair parameters of the present invention.

FIG. 3 is a side view of a rim 59 of a rotor wheel 18. The dovetail profile combined with the skew angle results in a natural stress concentration at a dovetail acute corner 60 of a dovetail slot 62. During operation, thermal gradients develop on the rotor wheel 18 between rim 59 and a bore of the rotor wheel 18, the severity of which is a function of the mode of air circulation around the rotor, the local gas path temperatures at rim 59, and the thermal inertia of the bore relative to rim 59. The thermal gradients induce rim hoop stresses and dovetail post twisting, while the blade pull induces rim radial and bending stresses, which in combination results in high principal stresses at dovetail acute corner 60. A complex stress field exists in dovetail acute corner 60. The stress intensity of the stress field is the resultant of two stress components, hoop and radial, which peak in the dovetail acute corner 60 radius. To reduce the principal stress, these component stresses also need to be de-coupled.

The plane strain condition at rim 59 is a result of the thermal inertia difference between the bore and rim 59. Rim 59, which deflection is controlled by the bore is in compression during a start-up and in tension during a shut-down. The shut-down condition typically represents the condition where the maximum tensile principal stress develops in rim 59 and in dovetail acute corners 60 which is responsible for the crack initiation. Because this is a deflection controlled situation, and not a load controlled situation, the dovetail stresses can be reduced by a reduction in the cross-sectional area of the rim carrying the hoop stress.

Figure 4:
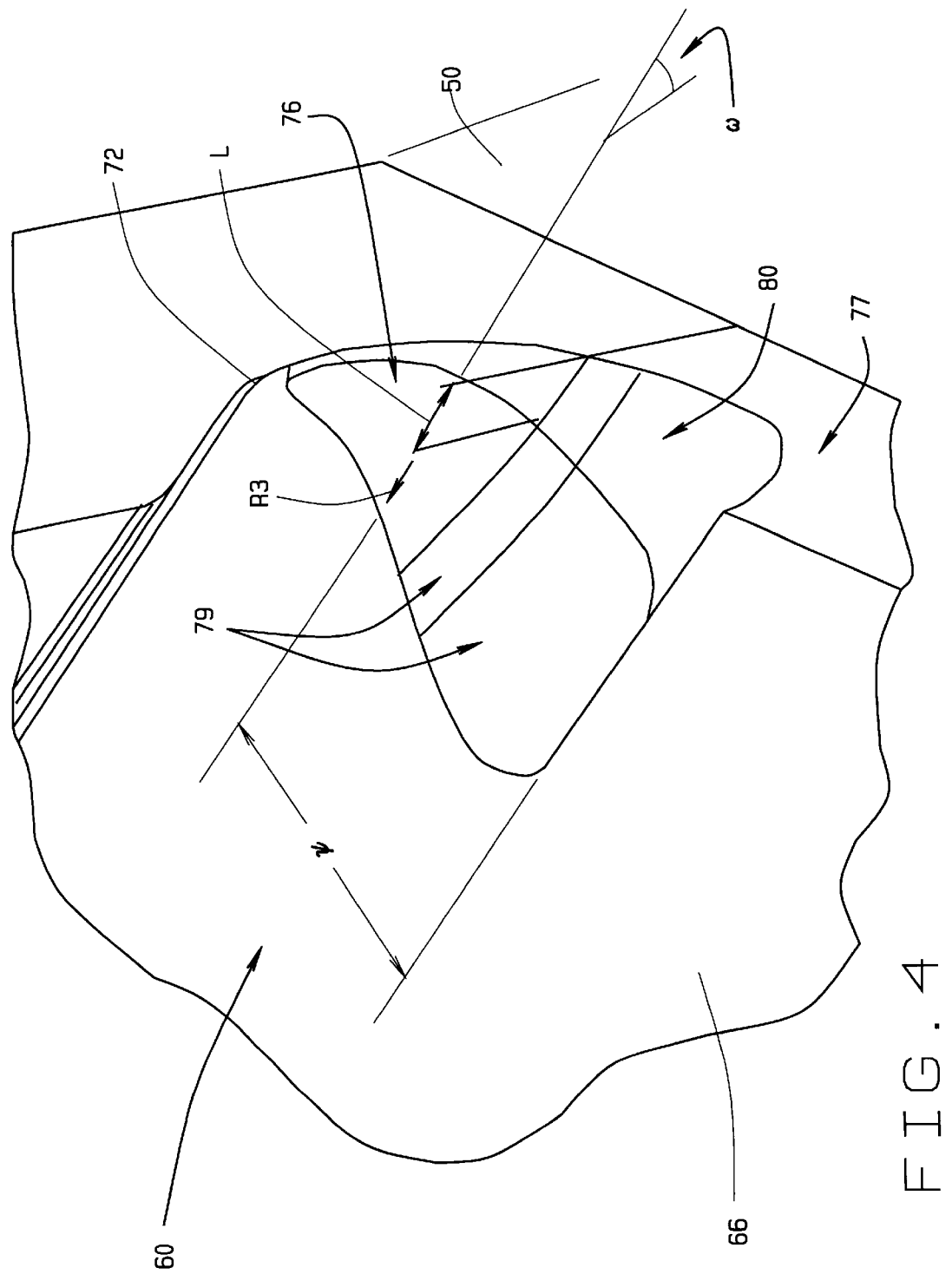
FIG. 4 is a perspective view of the repaired rim area after repair.

FIGS. 3 and 4 show geometric parameters of which control the level of stresses near acute corner 60. A repair pocket 76 is formed at the location of the stresses. As shown in FIG. 4, repair pocket 76 is formed at the intersection of an edge 77 of rim 59 and acute corner 60 of dovetail slot 62. In one embodiment, the repairing of rim 59 is performed using standard or special tooling, such as an R3 ball end mill, on a 5 axis numerically controlled mill.

A first pocket 76A is formed having a radius of curvature R1. A tool (not shown) then travels a distance $\Delta$ removing material along a slot bottom wall 66. The tool then forms a second pocket 76B having a radius of curvature R2. Pockets 76A and 76B combine together to form repair pocket 76. In one embodiment, the tool then travels back toward first pocket 76A to link both first and second pockets 76A and 76B in a tangent manner to preserve profile contour smoothness. In another embodiment, radius of curvature R2 is greater than radius of curvature R1. In a further embodiment, repair pocket 76 is a body of revolution having a substantially oval-shaped cross-sectional profile. Repair pocket 76 relieves stress fields in rim 59 and de-couples stress components present in dovetail slot 62. Using a 5 axis numerically controlled mill, the exact tool path motion can be optimized differently to achieve the same repair pocket.

The exact shape of repair pocket 76 is a function of the parameters defined to provide an acceptable repair design solution. When the repair pocket geometric shape is subtracted from the baseline geometry at acute corner 60, the resulting geometry represents the invention described herein. Parameter R1 permits de-coupling the principal stresses at acute corner 60 to a radial component and a hoop component. Parameter R1 originates from a tangency point 78 between dovetail acute corner 60 radius and dovetail pressure face 72 as one end of the radius (leaving the surface at a right angle until the parameter value locates the center of the circle).

Parameter $\Delta$ represents the minimum distance required to put the stress field in rim 59 into plane strain conditions. In one embodiment, the distance $\Delta$ is substantially parallel to the dovetail slot bottom wall 66. Increasing the distance can provide additional benefits, however these benefits need to be balanced with the economics of performing the repair.

Parameter R2 permits additional reduction in hoop stress by taking advantage of the plane strain field (less thickness, less stress) and may be limited by the minimum acceptable local outer rim thickness desired or the time of machining desired once the stress levels were at an acceptable level. A repaired dovetail slot 62 with repair pocket 76 is shown in FIG. 4. Repair pocket 76 has a back repair pocket 79 and a front repair pocket 80.

Parameter R3 controls the stress in back pocket 79 relative to the front of repair pocket 80. For design consideration, it was determined that the peak stress occurring in back pocket 79 resulting from the introduction of the repair could not be higher than the maximum stress occurring at R1 to ensure that crack initiation would occur again (if at all) at R1.

Parameter $\Psi$, the angle at which the repair pocket is machined, was found to be optimum when Parameter $\Psi$ is substantially equivalent to the dovetail skew angle, as it was also creating a shielding effect for the acute corner 60. When looking at cumulative mission damage, this shielding ensured that any locations outside of the repair area was not becoming the life limiting location after repair.

Parameter L, the distance along slot bottom wall 66, was found to increase the stress with increasing penetration. In one embodiment, the crack size is an upper limit for parameter L. Parameter L is similar to an extrusion dimension of the repair pocket profile into the dovetail slot, forming a cylindrical body of revolution, at the end of which is the start of Parameter R3 of back pocket 79.

Parameter $\omega$, is the pitch between dovetail slot bottom wall 66 and the tool (not shown). Parameter $\omega$ was found to be optimum when set to zero. Whereas, a non-zero pitch is akin to blending the crack out of dovetail slot 62 in a manner similar to the prior art.

Figure 5:
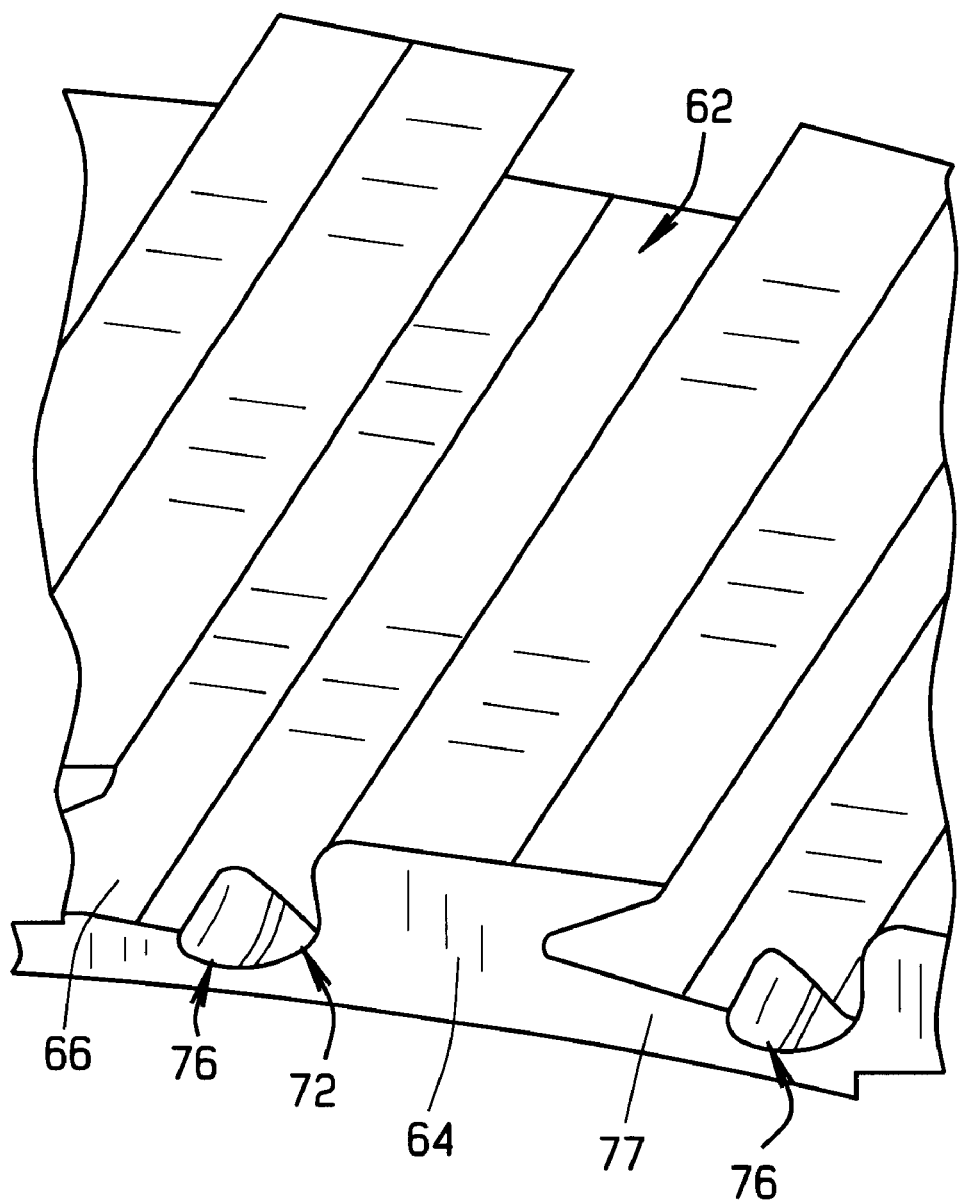
FIG. 5 is a top perspective view of the rim in FIG. 3 showing a plurality of repaired areas after repair.

R1, R2, and $\Delta$ work together in making rim 59 more compliant to the dovetail post twist, reducing the local bending stress in dovetail acute corner 60. In one embodiment, sharp-edges, such as along the dovetail face resulting from machining repair pocket 76 are removed. FIG. 5 shows a top view of outer rim 60 with a plurality of repair pockets 76 formed in acute corners 60.

In one embodiment, repair pocket 76 is formed with a contour, such as by machining, to substantially match a contour of existing slot bottom wall 66 in order to de-couple the stress field present in acute corner 60. In another embodiment, first and second pockets 76A and 76B are further machined to form a third pocket having a radius of curvature R3. Alternatively, radius of curvature R3 is less than or equal to radius of curvature R1 but less than the radius of curvature R2. An additional embodiment of the present invention incorporates local shot-peening of dovetail acute corner 60 repair to provide additional life benefit.

Repair pocket 76 removes the crack from dovetail slot 62. The repaired area has better or equivalent fatigue life as the baseline. The lowest fatigue life capability in the repaired area occurs in the vicinity of the original crack location and the repaired area does not adversely impact fatigue life outside the repaired area. The repair method reduces the stress intensity factor present at acute corner 60 while taking advantage of the plane strain conditions existing in rim 59.

The above-described dovetail slot achieves significant life improvement over the baseline. The dovetail slot includes a repair pocket that facilitates no additional service and improves the existing dovetail design life capability.

Because the repair pocket has specific geometric parameters for removing stress fields and cracks in the dovetail slot, the repaired dovetail slot has a significantly increased dovetail post life capability. As a result, the repair method facilitates salvaging compressor rotor parts with cracks and extends the useful life of a compressor wheel in a cost-effective and a time-saving manner.

Exemplary embodiments of a dovetail slot are described above in detail. The systems are not limited to the specific embodiments described herein, but rather, components of each assembly may be utilized independently and separately from other components described herein. Each dovetail slot component can also be used in combination with other dovetail slots and rotor components.

While the invention has been described in terms of various specific embodiments, those skilled in the art will recognize that the invention can be practiced with modification within the spirit and scope of the claims.

What is claimed is:

1. A method of repairing a rotor wheel including a rim, the rim having at least one slot defined by a slot bottom wall and at least one corner, the slot sized to receive the dovetail of a rotor blade therein, said method comprising:

forming a first pocket at the at least one corner, wherein the first pocket has a first radius of curvature; and forming a second pocket along the slot bottom wall, wherein the second pocket has a second radius of curvature and is spaced a distance along the slot bottom wall from a first notch.

2. A method in accordance with claim 1 wherein forming a second pocket further comprises forming a second pocket having a second radius of curvature that is larger than the first radius of curvature.

3. A method in accordance with claim 1 wherein the distance is a direction that is substantially parallel to the slot bottom wall.

4. A method in accordance with claim 1 wherein at least one of the first and second pockets is formed with a substantial oval-shaped cross-sectional profile.

5. A method in accordance with claim 1 further comprising forming the first and second pockets with a contour that substantially matches a contour of the existing slot bottom wall to de-couple stress in the at least one corner.

6. A method in accordance with claim 1 further comprising forming a third pocket between the first and second pockets, the third pocket having a third radius of curvature.

7. A turbine rotor wheel comprising:

a rotor wheel having a rim, said rim comprising at least one slot defined by a slot bottom wall and at least one corner, said at least one slot sized to receive a dovetail of a rotor blade therein, said at least one corner comprising a first pocket having a first radius of curvature and said slot bottom wall comprising a second pocket having a second radius of curvature, said second pocket spaced a distance along said slot bottom wall from said first notch, said first notch configured to facilitate reducing stress in said rim.

8. A turbine rotor wheel in accordance with claim 7 wherein said second radius of curvature is larger than said first radius of curvature.

9. A turbine rotor wheel in accordance with claim 7 wherein said distance is a direction that is substantially parallel to said slot bottom wall.

10. A turbine rotor wheel in accordance with claim 7 wherein at least one of said first notch is formed with a substantial oval-shaped cross-sectional profile.

11. A turbine rotor wheel in accordance with claim 7 wherein said first notch have a contour that substantially matches a contour of existing said slot bottom wall to de-couple stress in said at least one corner.

12. A turbine rotor wheel in accordance with claim 7 further comprises a third pocket between said first notch and second notch, said third pocket having a third radius of curvature.

13. A turbine comprising:

at least one rotor assembly comprising at least one rotor wheel with an outer rim;

at least one slot in said outer rim defined by a slot bottom wall and at least one corner, said at least one slot sized to receive a dovetail of a rotor blade therein;

a first pocket formed in said at least one corner, said first pocket having a first radius of curvature; and a second pocket having a second radius of curvature, said second pocket spaced a distance along said slot bottom wall, said first and second pockets configured to facilitate reducing stress in said rim.

14. A turbine in accordance with claim 13 wherein said second radius of curvature is larger than said first radius of curvature.

15. A turbine in accordance with claim 13 wherein said distance is a direction that is substantially parallel to said slot bottom wall.

16. A turbine in accordance with claim 13 wherein at least one of said first and second pockets is formed with a substantial oval-shaped cross-sectional profile.

17. A turbine in accordance with claim 13 wherein said first and second pockets have a contour that substantially matches a contour of existing said slot bottom wall to de-couple stress in said at least one corner.

18. A turbine in accordance with claim 13 further comprises a third pocket between said first and second pockets, said third pocket having a third radius of curvature.

* * * * *

UNITED STATES PATENT AND TRADEMARK OFFICE
CERTIFICATE OF CORRECTION

PATENT NO. : 6,837,685 B2 Page 1 of 1
APPLICATION NO. : 10/319101
DATED : January 4, 2005
INVENTOR(S) : Pierre It is certified that error appears in the above-identified patent and that said Letters Patent is hereby corrected as shown below:

In Claim 11, column 6, line 16, delete "first notch have" and insert therefor -- first notch has --.

Signed and Sealed this

Thirtieth Day of January, 2007

JON W. DUDAS
*Director of the United States Patent and Trademark Office*